United States Patent [19]

Yamamuro

[11] Patent Number: 4,607,267

[45] Date of Patent: Aug. 19, 1986

[54] OPTICAL INK JET HEAD FOR INK JET PRINTER

[75] Inventor: Tetsu Yamamuro, Tokyo, Japan

[73] Assignee: Ricoh Company, Ltd., Tokyo, Japan

[21] Appl. No.: 681,199

[22] Filed: Dec. 13, 1984

[30] Foreign Application Priority Data

Dec. 19, 1983 [JP] Japan .............................. 58-239476
Dec. 19, 1983 [JP] Japan .............................. 58-239477

[51] Int. Cl.$^4$ ............................................. G01D 15/18
[52] U.S. Cl. ............................. 346/140 R; 346/33 A
[58] Field of Search ......................... 346/140, 33 A

[56] References Cited

U.S. PATENT DOCUMENTS

| | | | |
|---|---|---|---|
| 3,480,962 | 11/1969 | Weigl | 346/140 X |
| 3,655,379 | 4/1972 | Gundlach | 346/140 X |
| 3,798,365 | 3/1974 | Browning | 346/140 X |
| 4,021,818 | 5/1977 | Van Vloten | 346/140 |
| 4,275,290 | 6/1981 | Cielo | 346/140 X |
| 4,312,009 | 1/1982 | Lange | 346/140 |
| 4,531,138 | 7/1985 | Endo | 346/140 |

OTHER PUBLICATIONS

Camphausen D. L.; Photoactivated Ink Spray, Xerox Disclosure Journal, vol. 1, No. 4, Apr. 1976, p. 75.
Kirk-Othmer, Encyclopedia of Chemical Technology, 3rd Ed., vol. 17, John Wiley & Sons, p. 540.

Primary Examiner—Joseph W. Hartary
Attorney, Agent, or Firm—Oblon, Fisher, Spivak, McClelland & Maier

[57] ABSTRACT

An optical ink jet head for an ink jet printer irradiates a photochemically reactive substance by an active electromagnetic wave to generate gas so that ink is ejected by the pressure of the gas. In optical communications, optical signals transmitted by optical fibers are directly used to drive an ink jet head to eject ink drops complementary to the optical signals from ink ejection nozzles of the head.

15 Claims, 10 Drawing Figures

OPTICAL INK JET HEAD FOR INK JET PRINTER

BACKGROUND OF THE INVENTION

The present invention relates to an ink jet printer and, more particularly, to a novel optical ink jet head which generates gas by irradiation of a photochemically reactive substance by visible rays, ultraviolet rays, X rays or like active electromagnetic waves so as to eject ink by the pressure of the gas.

Well known in the printing art is an ink jet printer which ejects drops of ink from an ink jet head toward a paper to print out desired information on the paper. In prior art ink jet printers, the ejection of ink drops has been implemented by various types of ink jet heads such as an electric field on-demand type, a magnetism on-demand type, an on-demand type using an inorganic electrostrictive element, and a bubble type producing bubbles by thermal pulses to cause ink drops to be ejected by the expansion pressure of the bubbles. All such prior art ink jet heads are driven by electrical signals and not directly driven by optical signals.

Remarkable progress recently achieved in the optical communications art has made it possible to transmit and receive signals which contain various kinds of information over optical fibers or the like. Concerning such optical communications, it is preferable that received optical signals be directly stored in a storage or printed out by a printer without being converted into electrical signals. Especially, in relation to the application of an ink jet printer as the printer described, there is an increasing demand for a capability of reproducing information directly from optical signals which convey the information.

SUMMARY OF THE INVENTION

It is therefore an object of the present invention to provide a new and useful optical ink jet head which ejects ink drops directly driven by optical signals.

It is another object of the present invention to provide a multi-nozzle optical ink jet head furnished with a multi-nozzle construction for ejecting ink directly driven by optical signals.

It is another object of the present invention to provide an ink jet printer which drives an ink jet head thereof to eject ink drops from a nozzle by using transmitted optical signals in optical communications as they are.

It is another object of the present invention to provide a generally improved optical ink jet head for an ink jet printer.

In one aspect of the present invention, there is provided an optical ink jet head for ejecting ink in response to an active electromagnetic wave, comprising an ink ejection nozzle for ejecting ink, a chemical reaction device communicating with the ink ejection nozzle and storing a photochemical rective substance for causing the photochemical reactive substance to undergo a chemical reaction, and an active electromagnetic wave supply device for routing the active electromagnetic wave to the chemical reaction device, irradiating the photochemical reactive substance by the active electromagnetic wave to generate gas, and causing the ink to be ejected from the ink ejection nozzle by a pressure of the gas.

In another ascpect of the present invention, there is provided an optical ink jet head for ejecting ink in response to an active electromagnetic wave, comprising a first assembly made up of a plurality of ink ejection nozzles arranged in an array, and a plurality of chemical reaction devices communicated in one-to-one correspondence with the nozzles and each storing a photochemical reactive substance for causing the photochemical reactive substance to undergo a reaction, a second assembly connected to the first assembly and having a plurality of ink supply devices which are provided in one-to-one correspondence with the chemical reaction device for supplying ink to the respective chemical reaction devices, and a third assembly connected to the first and second assemblies and having a plurality of active electromagnetic wave supply devices which are provided in one-to-one correspondence with the chemical reaction devices for conducting the active electromagnetic waves to the respective reaction devices to irradiate the chemical reaction substance stored in the respective chemical reaction devices by the active electromagnetic waves to generate gas and, thereby, cause the ink to be ejected from the respective nozzles by a pressure of the gas.

In accordance with the present invention, an optical ink jet head for an ink jet printer irradiates a photochemical reactive substance by an active electromagnetic wave to generate gas so that ink is ejected by the pressure of the gas. In optical communications, optical signals transmitted by optical fibers are directly used to drive an ink jet head to eject ink drops complementary to the optical signals from ink ejection nozzles of the head.

The above and other objects, features and advantages of the present invention will become apparent from the following detailed description taken with the accompanying drawings.

DESCRIPTION OF THE PREFERRED EMBODIMENTS

While the optical ink jet head for an ink jet printer of the present invention is susceptible of numerous physical embodiments, depending upon the environment and requirements of use, substantial numbers of the herein shown and described embodiments have been made, tested and used and all have performed in an eminently satisfactory manner.

It should be born in mind that the words "active electromagnetic wave" used herein refer to those electromagnetic waves which cause chemical reactions in optically reactive substances when applied thereto, and that such waves will be represented by visible rays by way of example in relation to an "optical" ink jet printer, an "optical" ink jet head, etc.

Figure 1:
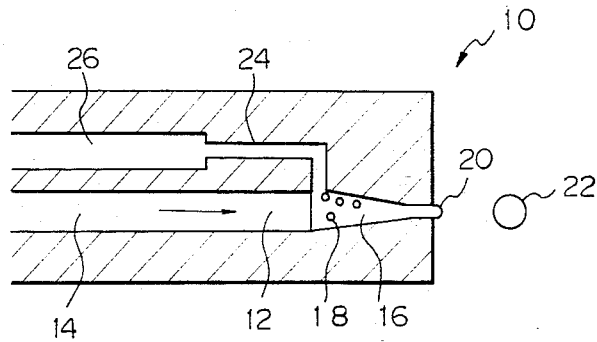
FIG. 1 is a sectional view of an optical ink jet head embodying the present invention which is provided with a single nozzle.

Referring to FIG. 1 of the drawings, an optical ink jet head with a single nozzle embodying the present invention is shown and generally designated by the reference numeral 10. The head 10 comprises a wave guide 12 defined by an optical fiber or the like for guiding an active electromagnetic wave, a chemical reaction chamber 16 for generating gas 18, an ink ejection nozzle 20 for ejecting an ink drop 22, a nozzle 24 for restricting the flow of a fluid, and an ink supply passageway 26. The active electromagnetic wave 14 propagating through the wave guide 12 causes a certain component of the ink to chemically react therewith in the reaction chamber 16 to thereby generate the gas 18. By the resulting pressure of the gas 18, the ink drop 22 is ejected from the nozzle 20.

Hereinafter will be described examples of chemical reactions which may be caused by radiation of the active electromagnetic wave 14 to generate the gas 18.

EXAMPLE 1

Alcohol and water efficiently generate hydrogen gas under the presence of an optical catalyst as formulated below:

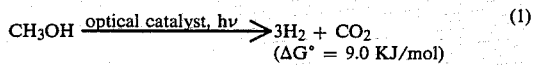

$$CH_3OH \xrightarrow{\text{optical catalyst, } h\nu} 3H_2 + CO_2 \quad (1)$$
$$(\Delta G^\circ = 9.0 \text{ KJ/mol})$$

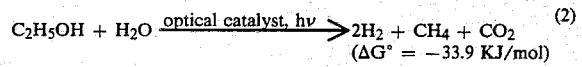

$$C_2H_5OH + H_2O \xrightarrow{\text{optical catalyst, } h\nu} 2H_2 + CH_4 + CO_2 \quad (2)$$
$$(\Delta G^\circ = -33.9 \text{ KJ/mol})$$

The quantum yields (Q.Y.) of the hydrogen generation are shown below in Table 1. Here, Q.Y. is 2×number of $H_2$ molecules/number of incident photoelectrons and the irradiation wavelength $\lambda$ is 380 mm.

TABLE 1

|  | OPTICAL CATALYST | QUANTUM YIELD (%) |
| --- | --- | --- |
| $CH_3OH + H_2O$ | $TiO_2$ | 3 |
|  | $RuO_2/TiO_2/Pt$ | 55 |
| $C_2H_5OH + H_2O$ | $TiO_2$ | 0.9 |
|  | $TiO_2/Pt$ | 38 |

In Table 1, catalysts such as Pt and $RuO_2$ are supported by $TiO_2$. The optical catalyst is located in the reaction chamber 16 of FIG. 1, while the ink is dissolved in the aqueous solution of alcohol so that ink in the ink chamber is ejected due to the above-described efficient generation of hydrogen.

EXAMPLE 2

Figure 2:
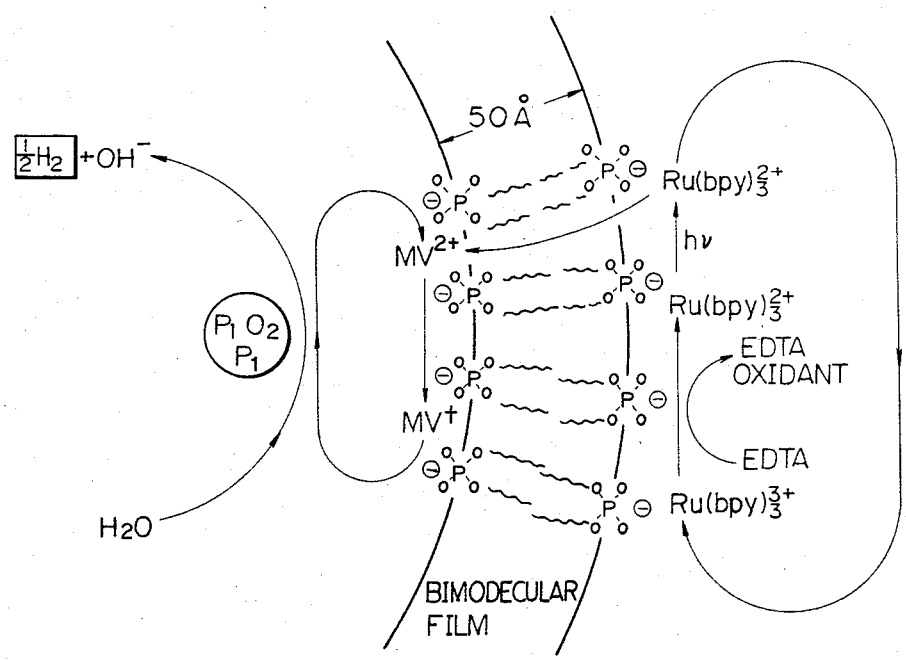
FIG. 2 is a diagram showing the scheme of photosensitized electron transfer and generation of hydrogen caused by a vesicle film.

An artificial vesicle film (oval, small vesicular bimolecular film) is utilized to generate hydrogen gas with high efficiency. In this example, use is made of dihexadodecyl phosphoric acid as the vesicle film. When a ruthenium complex ($Ru(bpy)_3^{3+}$) and methylviologen ($MV^{2+}$) are adsorbed by opposite surfaces of the vesicle film, an uphill photoelectron transfer reaction occurs which traverses the vesicle film from optically excited $Ru(bpy)_3^{2+}$ to the acceptor $MV^{2+}$. The result is an $H_2$ generation reaction which proceeds with a velocity constant as large as $7.7 \times 10^5 \text{ sec}^{-1}$. Such a reaction scheme is shown in FIG. 2.

Both the examples 1 and 2 discussed above represent generation of hydrogen gas which is triggered by optical energy. In the future, the study of efficient hydrogen generation reactions triggered by optical energy is expected to further advance in relation to the use of solar energy. One advantage of the present invention is its potential capability of taking advantage of even the result of such advanced study.

EXAMPLE 3

Quinonediazido is irradiated to generate nitrogen gas as formulated below:

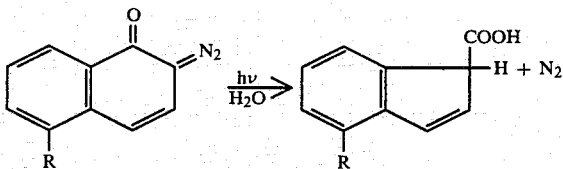

EXAMPLE 4

Diazonium is optically decomposed to generate nitrogen gas as follows:

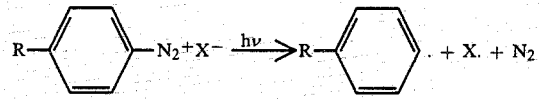

In the embodiment of the single-nozzle type ink jet head described above, a photochemically reactive substance and ink are commonly communicated to a same chamber. Such is not limitative, however, as will be understood from the following description.

Figure 3:
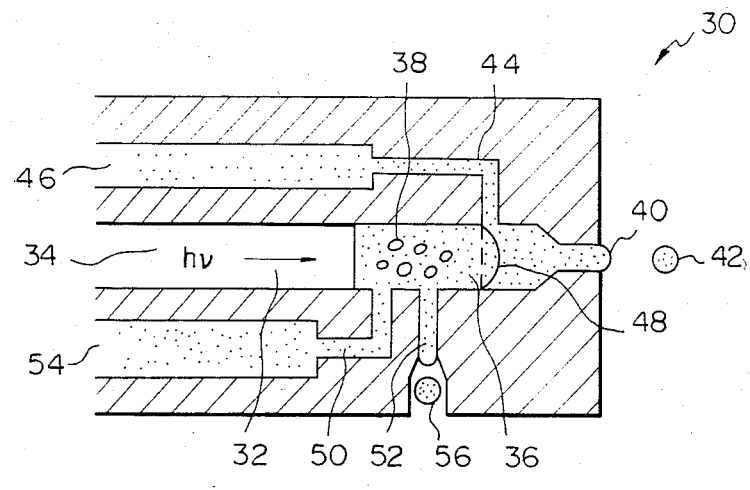
FIGS. 3 and 4 are sectional views showing other embodiments of the single nozzle type head arrangement in accordance with present invention.

Referring to FIG. 3, another embodiment of the single nozzle head arrangement in accordance with the present invention is shown. The head, generally 30, comprises a wave guide 32 for guiding an active electromagnetic wave 34, a chemical reaction chamber 36 for generating gas 38, an ink ejection nozzle 40 for ejecting an ink drop 42, a nozzle 44 for restricting the flow of a fluid, an ink supply passageway 46, a flexible diaphragm 48, and nozzles 50 and 52 for also rescticting the flow of a fluid. A substance 54 reactive to light is supplied to the nozzle 50 and, by the pressure of gas generated in the reaction chamber 36, discharged via the nozzle 52. In short, the illustrative embodiment of FIG. 3 is constructed to physically separate the reactive substance 54 and the ink by the diaphragm 48 so that a photochemical reaction may occur in a chamber discrete from the ink passageway 46. Specifically, an aqueous solution of alcohol which is a photochemical reactive substance discussed in Example 1 of the first embodiment is communicated to the discrete reaction chamber 36 so as to generate gas 38 such as hydrogen gas therein by a photochemical reaction, the resulting pressure vibrating the diaphragm 48 to eject the ink.

Figure 4:
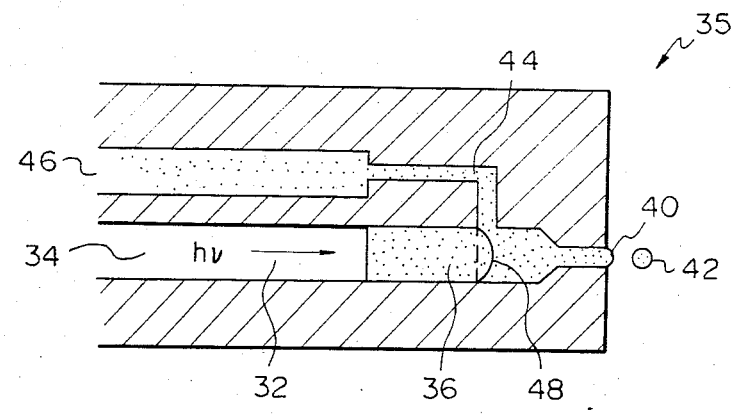

Still another embodiment of the single-nozzle type head construction is shown in FIG. 4. In FIG. 4, the same or similar structural elements as those shown in FIG. 3 are designated by like reference numerals. The head, generally 35, in FIG. 4 uses a reversible photochemical reactive substance in order to eliminate the need for continuous supply of unused reactive substance, which is particular to the embodiment of FIG. 3. Specifically, the reversible photochemical reactive substance is stimulated by, for example, two different kinds of light, i.e., one for causing a forward photochemical reaction and the other for causing a reverse photochemical reaction. The forward reaction increases the volume of the reaction chamber 36 to vibrate the diaphragm 48 and, thereby, eject an ink drop, while the reverse reaction returns the product of the forward reaction to the original photochemical reactive substance.

While the present invention has been shown and described in relation to a single nozzle type construction, it may naturally be implemented by a multi nozzle type constructions. Hereinafter will be described embodiments of a multi-nozzle optical ink jet head in accordance with the present invention.

Figure 5:
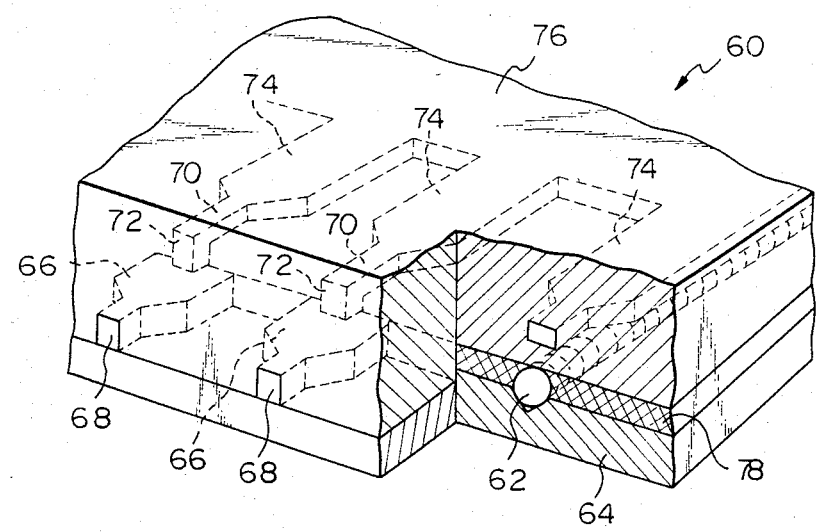
FIG. 5 is a partly sectional perspective view of an optical ink jet head in accordance with the present invention which is provided with a plurality of nozzles.

Referring to FIG. 5, a multi-nozzle optical ink jet head 60 is shown which employs the head construction of FIG. 1 as its basic or module construction. As shown, the head 60 comprises a plurality of optical fibers 62, a V-grooved positioning member 64 for positioning the optical fibers 62, chemical reaction chambers 66 each for causing a chemical reaction therein in response to an active electromagnetic wave which is guided by the associated optical fiber 62, an ink ejection nozzle 68 associated with each reaction chamber 66, nozzles 70 and 72 each for restricting the flow of a fluid, ink supply portions 76, and a filler 78 such as epoxy.

Figure 6:
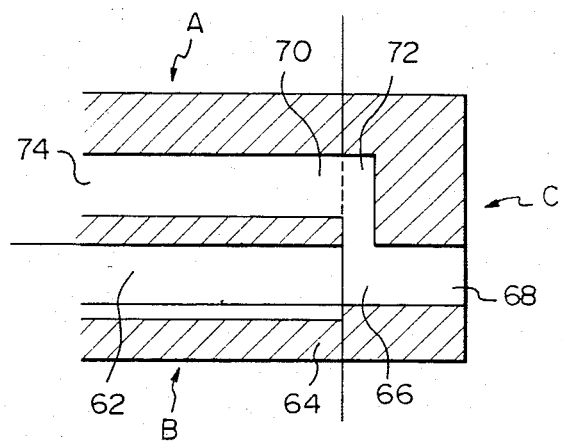
FIG. 6 is a vertical section of the multi-nozzle head shown in FIG. 5.

A more specific structure of and method of producing the multi-nozzle head 60 shown in FIG. 5 will be described with reference to FIGS. 6-9. FIG. 6 is a sectional side elevation of the head 60 of FIG. 5 as seen in a direction perpendicular to the array of the nozzles 68, while FIGS. 7-9 respectively are fragmentary views of those portions which are labeled A, B and C in FIG. 6. In more detail, FIG. 7 shows the ink supply passageways 74 and the restriction nozzle 70 portions, FIG. 8 the array of optical fibers 62 fixed in place in the V-grooved positioning member 64 by the filler 78, and FIG. 9 the reaction cambers 66, ink ejection nozzles 68 and restriction nozzles 72 as seen from the optical fiber array side.

Figure 7:
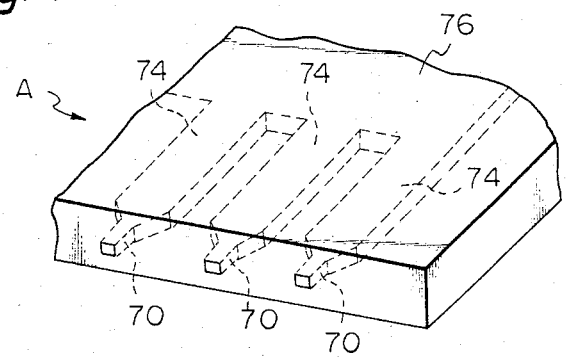
FIGS. 7-9 are perspective views of various structural elements of the head shown in FIG. 5.
Figure 8:
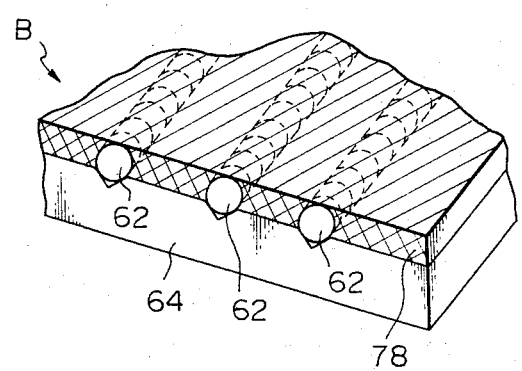
Figure 9:
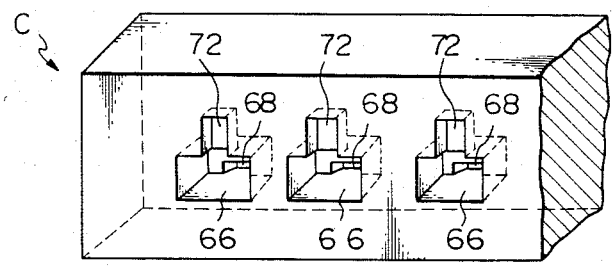

To produce the multi-nozzle head 60 described above, the portions A, B and C shown in FIG. 6 are produced independently of each other as shown in FIGS. 7-9 and, then, put together. Specifically, the portion A is abutted against the top of the portion B by either mechanical means or chemical means such as adhesion so that the optical fibers 62 respectively are aligned with the ink supply passageways 72 and restriction nozzles 70, and then the portion C is abutted against the subassembly of the portions A and B such that the restriction nozzles 72 respectively are aligned with the restriction nozzles 70 and the optical fibers 62 are aligned with the reaction chambers 66, either mechanically or chemically.

Figure 10:
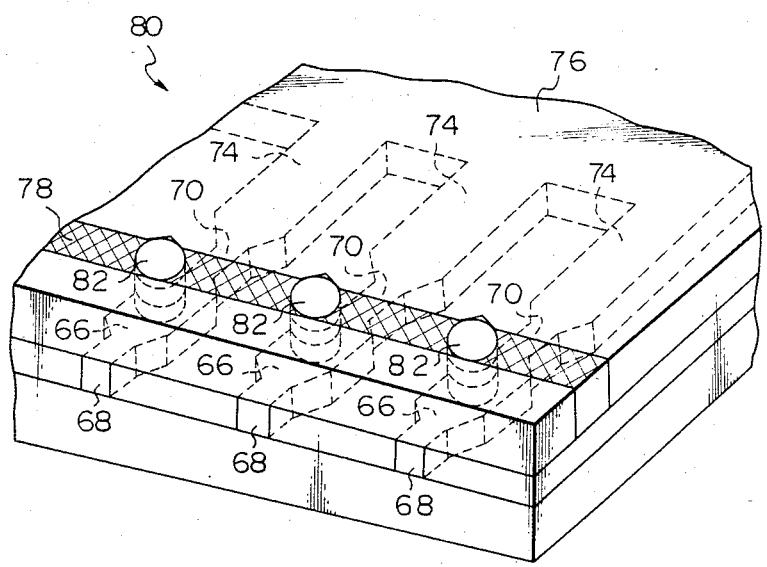
FIG. 10 is a perspective view of another embodiment of the multi-nozzle type head arrangement in accordance with the present invention.

Referring to FIG. 10, another embodiment of the multi-nozzle head configuration in accordance with the present invention is shown. In FIG. 10, the same or similar structural elements as those shown in FIGS. 5-9 are designated by like reference numerals. The head 80 in FIG. 10 is distinguishable from the head 60 in that optical fibers 82 each extend perpendicular to the direction of ink ejection. This alternative arrangement facilitates the production since the bottoms of the reaction chambers 66 and those of the ink supply passageways 74 can be placed integrally on a same base member.

In summary, it will be seen that the present invention provides an ink jet printer which is capable of printing out information by directly using optical signals and, therefore, recording optical signals from an optical fiber as they are in optical communications. In addition, the printer of the present invention is feasible for a small size, multi-nozzle arrangement.

Various modifications will become possible for those skilled in the art after receiving the teachings of the present disclosure without departing from the scope thereof.

What is claimed is:

1. An optical ink jet head for ejecting ink in response to an active electromagnetic wave, comprising:
   ink ejection nozzle means for ejecting ink;
   chemical reaction means communicating with said ink ejection nozzle means and storing a photochemical reactive substance for causing the photochemical reactive substance to undergo a chemical reaction; and
   active electromagnetic wave supply means for routing the active electromagnetic wave to said chemical reaction means, irradiating the photochemical reactive substance by the active electromagnetic wave to cause a photochemical chemical reaction which generates gas, and causing the ink to be ejected from the ink ejection nozzle means by a pressure of the gas.

2. An optical ink jet head as claimed in claim 1, further comprising ink supply means for supplying ink to the chemical reaction means, and photochemical reactive substance supply means for supplying the photochemical reactive substance to the photochemical reaction means.

3. An optical ink jet head as claimed in claim 2, wherein the ink supply means comprises an ink supply passageway and a nozzle for restricting a flow of the ink in said ink supply passageway.

4. An optical ink jet head as claimed in claim 2, wherein the photochemical reactive substance supply means comprises a photochemical reactive substance supply passageway and a nozzle for restricting a flow of the photochemical reactive substance in said photochemical reactive substance supply passageway.

5. An optical ink jet head as claimed in claim 2, wherein the ink ejection nozzle means comprises a single ink ejection nozzle, the chemical reaction means comprising a single chemical reaction chamber.

6. An optical ink jet head as claimed in claim 5, further comprising diaphragm means for dividing the chemical reaction chamber into a first chamber communicating with the ink supply means and the ink ejection nozzle means, and a second chamber communicating with the chemical reactive substance supply passageway to be supplied with the photochemical reactive substance and irradiated by the active electromagnetic wave to generate gas.

7. An optical ink jet head as claimed in claim 2, wherein the ink ejection nozzle means comprises a plurality of nozzles arranged in an array, the chemical reaction means comprising a plurality of chemical reaction chambers which are communicated in one-to-one correspondence with said nozzles, the active electromagnetic wave supply means comprising a plurality of optical fibers which are communicated in one-to-one correspondence with said chemical reaction chambers.

8. An optical ink jet head as claimed in claim 7, wherein the nozzles, the reaction chambers and the optical fibers are constructed integrally with each other.

9. An optical ink jet head as claimed in claim 1, wherein the active electromagnetic wave supply means comprises an optical fiber.

10. An optical ink jet head for ejecting ink in response to an active electromagnetic wave, comprising:
   a first assembly made up of a plurality of ink ejection nozzles arranged in an array, and a plurality of chemical reaction means communicated in one-to-one correspondence with said nozzles and storing a photochemical reactive substance for causing the reactive substance to undergo a photochemical reaction;
   a second assembly connected to said first assembly and having a plurality of ink supply means which are provided in one-to-one correspondence with the chemical reaction means for supplying ink to the respective chemical reaction means; and
   a third assembly connected to said first and second assemblies and having a plurality of active electromagnetic wave supply means which are provided in one-to-one correspondence with the chemical reaction means for conducting the active electromagnetic waves to the respective chemical reaction means to irradiate the chemical reaction substance stored in the respective chemical reaction means by the active electromagnetic waves to generate gas and, thereby, cause the ink to be ejected from the respective nozzles by a pressure of the gas.

11. An optical ink jet head as claimed in claim 10, wherein each of the chemical reaction means comprises a chemical reaction chamber.

12. An optical ink jet head as claimed in claim 10, wherein each of the ink supply means comprises an ink supply passageway.

13. An optical ink jet head as claimed in claim 10, wherein each of the active electromagnetic wave supply means comprises an optical fiber.

14. An optical ink jet head as claimed in claim 13, wherein each of the optical fibers extends parallel to an intended direction of ink ejection from the nozzles.

15. An optical ink jet head as claimed in claim 13, wherein each of the optical fibers extends perpendicular to an intended direction of ink ejection from the nozzles, the first to third assemblies being constructed integrally with each other.

* * * * *